United States Patent
Lu et al.

(10) Patent No.: US 12,151,204 B1
(45) Date of Patent: Nov. 26, 2024

(54) CATALYTIC OXIDATION SYSTEM FOR EFFICIENT CONVERSION AND REMOVAL OF VOLATILE ORGANIC COMPOUNDS (VOCs) IN COAL CHEMICAL INDUSTRY, AND CATALYTIC OXIDATION METHOD THEREOF

(71) Applicants: Zhejiang University, Hangzhou (CN); Taizhou Institute of Zhejiang University, Taizhou (CN)

(72) Inventors: Shengyong Lu, Hangzhou (CN); Bing Zhou, Hangzhou (CN); Yaqi Peng, Hangzhou (CN); Minghui Tang, Hangzhou (CN); Kai Zhang, Hangzhou (CN); Hao Zhang, Hangzhou (CN); Jiamin Ding, Hangzhou (CN); Guanjie Wang, Taizhou (CN)

(73) Assignees: Zhejiang University, Hangzhou (CN); Taizhou Institute of Zhejiang University, Taizhou (CN)

( * ) Notice: Subject to any disclaimer, the term of this patent is extended or adjusted under 35 U.S.C. 154(b) by 0 days.

(21) Appl. No.: 18/657,812

(22) Filed: May 8, 2024

(30) Foreign Application Priority Data

Jul. 14, 2023 (CN) .......................... 202310866816.1

(51) Int. Cl.
*B01D 53/86* (2006.01)
*B01D 53/88* (2006.01)

(52) U.S. Cl.
CPC ..... *B01D 53/8668* (2013.01); *B01D 53/8696* (2013.01); *B01D 53/885* (2013.01); *B01D 2257/708* (2013.01); *B01D 2258/0283* (2013.01)

(58) Field of Classification Search
CPC .............. B01D 53/885; B01D 53/8696; B01D 53/8668
USPC ....................................................... 423/245.3
See application file for complete search history.

(56) References Cited

FOREIGN PATENT DOCUMENTS

| CN | 102847421 A | 1/2013 |
|----|-------------|--------|
| CN | 102913919 A | 2/2013 |
| CN | 105650651 A | 6/2016 |
| CN | 207936055 U | 10/2018 |

(Continued)

OTHER PUBLICATIONS

CN214809839U—English translation (Year: 2021).*
CN102847421A—English translation (Year: 2013).*
CN207936055U—English translation (Year: 2018).*

*Primary Examiner* — Anita Nassiri-Motlagh
(74) *Attorney, Agent, or Firm* — Bayramoglu Law Offices LLC

(57) ABSTRACT

A catalytic oxidation system for efficient conversion and removal of volatile organic compounds (VOCs) in a coal chemical industry is provided. The catalytic oxidation system includes a reactor and a first temperature control system, where the reactor is provided with a waste gas inlet and a waste gas outlet and is provided with a preheating zone, a reaction zone, and a heat recovery zone sequentially in a flow direction of a waste gas, and a catalyst is filled in the reaction zone; and the first temperature control system includes a first serpentine pipe buried in the catalyst and a first steam drum arranged outside the reactor, the first steam drum and the first serpentine pipe are connected through a pipeline to form a circulation line, and a temperature in the reaction zone is adjusted to 150° C. to 350° C. by controlling a pressure of the first steam drum.

15 Claims, 1 Drawing Sheet

(56) References Cited

FOREIGN PATENT DOCUMENTS

| CN | 212057325 U | 12/2020 |
| CN | 112709998 A | 4/2021 |
| CN | 214809839 U | 11/2021 |

* cited by examiner

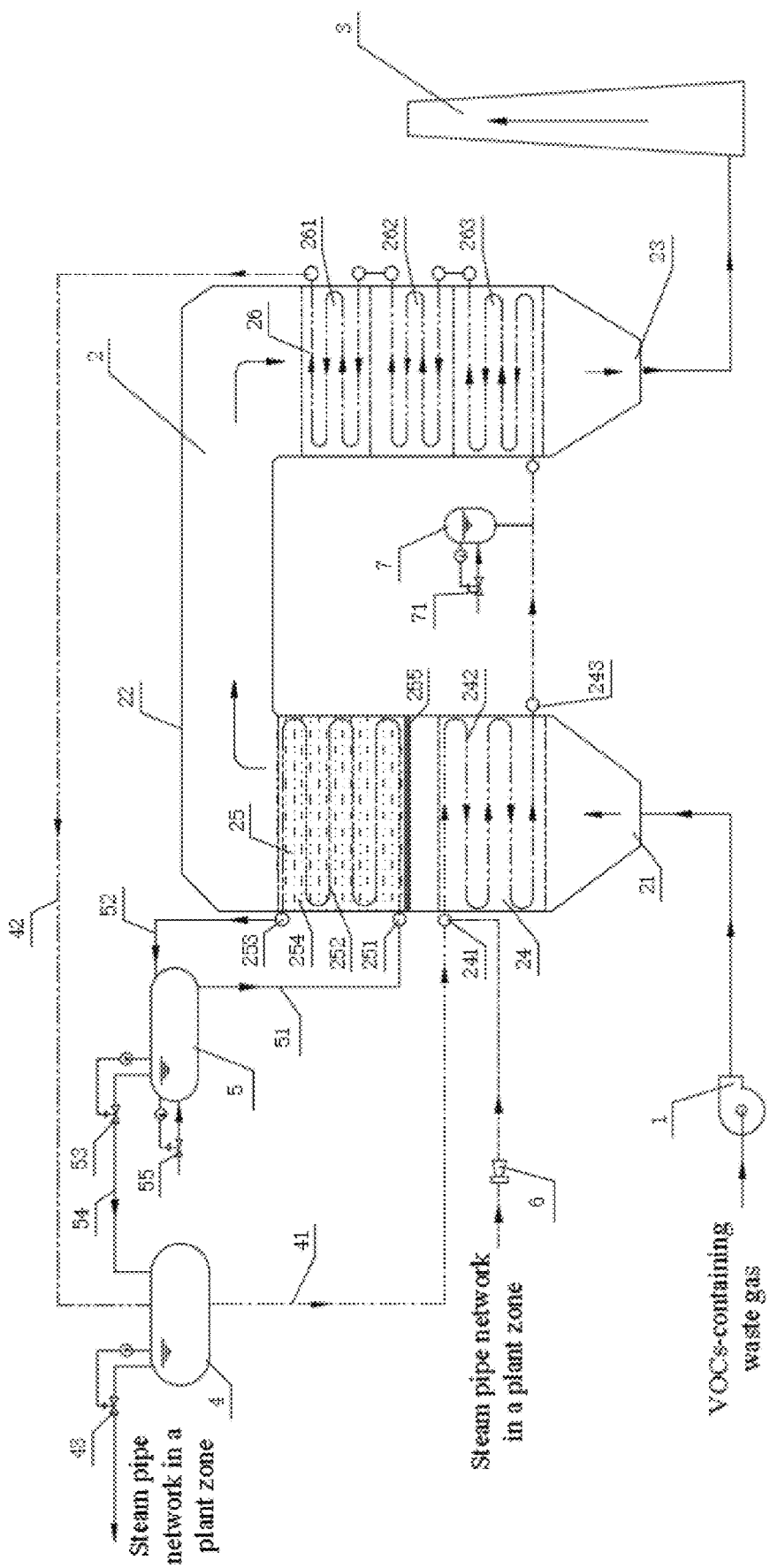

CATALYTIC OXIDATION SYSTEM FOR EFFICIENT CONVERSION AND REMOVAL OF VOLATILE ORGANIC COMPOUNDS (VOCs) IN COAL CHEMICAL INDUSTRY, AND CATALYTIC OXIDATION METHOD THEREOF

CROSS REFERENCE TO THE RELATED APPLICATIONS

This application is based upon and claims priority to Chinese Patent Application No. 202310866816.1, filed on Jul. 14, 2023, the entire contents of which are incorporated herein by reference.

TECHNICAL FIELD

The present disclosure relates to the technical field of waste gas treatment, and in particular to a catalytic oxidation system for efficient conversion and removal of volatile organic compounds (VOCs) in a coal chemical industry, and a catalytic oxidation method thereof.

BACKGROUND

VOCs are important pollutants affecting the environment and the human body and are also important precursors for ozone, PM2.5, secondary organic aerosols, or the like in the atmosphere. The coal chemical industry is one of the important sources of atmospheric pollution and has strict requirements for environmental protection. On Jul. 21, 2022, the Ministry of Ecology and Environment of the People's Republic of China reported the national ecological and environmental quality status in the first half of the year. Specifically, the ambient air quality in China was improved as a whole, and among the six major pollutants, five decreased and one increased, and the ozone concentration rebounded, mainly because the emission levels of the precursors NOx and VOCs remained high. Thermal treatment is currently the mainstream technology for the control of VOCs emissions in the coal chemical industry. The thermal treatment mainly includes a direct combustion method and a catalytic oxidation method. Because most of the VOCs-containing waste gases in the coal chemical industry have characteristics such as high calorific value and high concentration, the direct combustion method is the mainstream technology for the control of VOCs in the coal chemical industry at present. However, the direct combustion method involves a relatively high operating temperature (800° C. to 1,200° C.) and generally requires the arrangement of a waste heat boiler downstream of a combustion device to recover the heat of a flue gas, resulting in a complicated system and high investment and operating costs. The catalytic oxidation method involves a relatively low operating temperature (150° C. to 600° C.) and has advantages such as low auxiliary fuel consumption, high safety, and low NOx emissions. Thus, the catalytic oxidation method is the development direction of control solutions for VOCs in the coal chemical industry.

The existing catalytic oxidation technologies are mainly suitable for the treatment of VOCs-containing waste gases with a relatively low concentration or a relatively low catalytic oxidation temperature (such as toluene and trichloroethane). However, there are few matching catalytic oxidation technologies for the VOCs-containing waste gases with a relatively high concentration or a relatively high catalytic oxidation temperature (short-chain hydrocarbons such as ethane, ethylene, and propane). In addition, there is a lack of systematic research and verification for the direction of the control of VOCs in the coal chemical industry. For example, the tail gas from rectisol washing for coal-based synthetic natural gas includes high concentrations of short-chain hydrocarbons such as ethane, ethylene, and propane and has a VOCs concentration generally as high as 6,000 ppm to 50,000 ppm. A large amount of heat is released during the catalytic oxidation process to easily cause a large fluctuation in the temperature of a catalyst bed and even cause the local temperature runaway of a catalyst, and a too-high temperature will destroy the structure of the catalyst, resulting in reduced efficiency or even inactivation of the catalyst.

In order to solve the above problems, the engineering technicians propose to control the heat of a catalytic oxidation reaction through the layering and staging of a catalyst, where excess heat generated by the reaction is taken away by a heat exchanger at an outlet of each stage to reduce a risk of the temperature runaway of the catalyst. For example, the following solutions are provided: Sectional Catalytic Combustion Process of High-Concentration Organic Waste Gas (application publication No.: CN112709998A), Multi-stage Catalytic Combustion Furnace (granted patent publication No.: CN212057325U), Purification Treatment Method of High-Concentration Organic Waste Gas (application publication No.: CN105650651A), and Method for Purifying High-Concentration Organic Waste Gas (application publication No.: CN102913919A).

However, the existing technologies still have the following defects:

1) Because the heat is not directly extracted from the catalyst, the temperature of a catalyst bed cannot be accurately controlled, and the catalyst bed is still at a risk of undergoing the local temperature runaway and has poor adaptability.

2) An electric heater used for preheating VOCs-containing waste gases is usually accompanied with a high energy consumption and a risk of waste gas deflagration.

3) The heat of an exhaust is generally recovered by an air-cooled heat exchanger, which has a low heat exchange efficiency and a high exhaust temperature, occupies a large floor space, and fails to effectively utilize the heat energy.

SUMMARY

In order to solve at least one of the technical problems mentioned in the background, an objective of the present disclosure is to provide a catalytic oxidation system for efficient conversion and removal of VOCs in a coal chemical industry, and a catalytic oxidation method thereof.

To allow the above objective, the present disclosure provides the following technical solutions:

A catalytic oxidation system for efficient conversion and removal of VOCs in a coal chemical industry is provided, including a reactor and a first temperature control system, where the reactor is provided with a waste gas inlet and a waste gas outlet and is provided with a preheating zone, a reaction zone, and a heat recovery zone sequentially in a flow direction of a waste gas, and a catalyst is filled in the reaction zone; and the first temperature control system includes a first serpentine pipe buried in the catalyst and a first steam drum arranged outside the reactor, the first steam drum and the first serpentine pipe are connected through a pipeline to form a circulation line, and a temperature in the reaction zone is adjusted to 150° C. to 350° C. by controlling a pressure of the first steam drum.

A natural circulation principle of the first temperature control system is as follows: liquid water in the first serpentine pipe is continuously heated by the reaction heat produced due to the catalytic oxidation of a waste gas, such that the liquid water changes from a liquid phase to a steam/liquid mixed phase, a buoyancy force is generated due to a density gradient, and a natural circulation flow is driven by a gravity difference.

In some embodiments of the present disclosure, the catalytic oxidation system further includes a second temperature control system,
  where the second temperature control system includes a second serpentine pipe arranged in the preheating zone, a third serpentine pipe arranged in the heat recovery zone, and a second steam drum arranged outside the reactor; the second steam drum is connected to an inlet end of the second serpentine pipe, an outlet end of the second serpentine pipe is connected to an inlet end of the third serpentine pipe, and an outlet end of the third serpentine pipe is connected to the second steam drum; the second serpentine pipe, the third serpentine pipe, and the second steam drum are connected through pipelines to form a passive natural circulation line; and a temperature of a waste gas at an outlet of the preheating zone is adjusted to 140° C. to 340° C. by controlling a pressure of the second steam drum.

A principle of passive natural circulation is as follows: liquid water is heated in the heat recovery zone to change from a liquid phase to a steam/liquid mixed phase and to have a decreased density, and is cooled in the preheating zone to have an increased density, and a gravity difference occurs between cold and hot sections to drive the natural circulation in a main pipeline, such that the heat is delivered from the heat recovery zone to the preheating zone. The passive natural circulation line can be free of any active components, which reduces the operating cost and avoids the problems such as pump failure and uneven flow distribution caused by a pump.

In some embodiments of the present disclosure, the catalytic oxidation system further includes an exhaust pipeline, where one end of the exhaust pipeline is connected to the first steam drum, and the other end of the exhaust pipeline is connected to the second steam drum; the first steam drum is further provided with a first pressure control valve; when the pressure of the first steam drum exceeds a set threshold, the first pressure control valve is opened, and a steam in the first steam drum is discharged into the second steam drum through the exhaust pipeline; and when the pressure of the first steam drum returns to be the set threshold or lower, the first pressure control valve is closed.

In some embodiments of the present disclosure, the second steam drum is provided with a second pressure control valve and an efflux pipeline; and when the pressure of the second steam drum exceeds a set threshold, the second pressure control valve is opened, and a steam in the second steam drum is delivered to a steam pipe network in a plant zone.

In some embodiments of the present disclosure, the set threshold is 0.47 MPa to 16.5 MPa. There is a saturated steam in an upper part and boiling water in a lower part inside the steam drum, and a liquid level of the boiling water is controlled at 60% to 70% of a volume of the steam drum.

In some embodiments of the present disclosure, the third serpentine pipe includes a superheating section, an evaporation section, and a low-temperature section arranged sequentially in the flow direction of the waste gas.

In some embodiments of the present disclosure, a water-supply and pressure-stabilizing tank is provided between the second serpentine pipe and the third serpentine pipe, and a pipeline pressure of the second temperature control system is stabilized between 0.47 MPa and 16.5 MPa by controlling a liquid level in the water-supply and pressure-stabilizing tank.

In some embodiments of the present disclosure, the first serpentine pipe is a high-temperature alloy steel pipe, and the second serpentine pipe and the third serpentine pipe each are a high-temperature alloy finned pipe.

In some embodiments of the present disclosure, a steam ejection pipe is connected to the inlet end of the second serpentine pipe, and when the catalytic oxidation system is started for the first time, the steam ejection pipe delivers a steam in a steam pipe network in a plant zone into the second serpentine pipe.

A catalytic oxidation method based on the catalytic oxidation system for efficient conversion and removal of VOCs in a coal chemical industry is provided, including the following steps:
  S1, feeding a waste gas into the reactor;
  S2, delivering the waste gas to the preheating zone, and preheating the waste gas to 140° C. to 340° C. to obtain a preheated waste gas; and
  S3, delivering the preheated waste gas to the reaction zone, controlling the temperature in the reaction zone at 150° C. to 350° C. by the first temperature control system, and allowing an oxidation reaction under a catalytic action of the catalyst to obtain a treated waste gas.

In some embodiments of the present disclosure, after the S3, the catalytic oxidation method further includes:
  S4, delivering the treated waste gas to the heat recovery zone, allowing a heat exchange in the superheating section, the evaporation section, and the low-temperature section sequentially to cool the treated waste gas to 60° C. to 90° C. to obtain a cooled treated waste gas, and discharging the cooled treated waste gas through a chimney.

Compared with the prior art, the present disclosure has the following beneficial effects:

1. The present disclosure allows the accurate temperature control of a catalyst bed through the first serpentine pipe buried in the catalyst to avoid the inactivation of the catalyst caused by a temperature runaway.

2. In the present disclosure, a waste gas is preheated by a steam instead of an electric heater, which can avoid the potential safety hazard of deflagration of a combustible gas.

3. In the present disclosure, the reaction heat released during the oxidation of a waste gas is fully recovered through the arrangement of a plurality of heat recovery zones. A part of the generated heat is used for preheating a waste gas, and the remaining part of the generated heat is delivered into a steam pipe network in a form of a steam, thereby allowing the purpose of energy conservation. Compared with the traditional direct combustion process, the present disclosure involves a low reactor temperature, and does not require the additional arrangement of a waste heat boiler downstream of a reactor to recover the heat.

4. The present disclosure adopts the principle of natural circulation, which reduces the operating cost, involves a simple process and convenient operations, and is safe and reliable.

BRIEF DESCRIPTION OF THE DRAWINGS

FIGURE is a schematic diagram of the overall system of the present disclosure.

REFERENCE NUMERALS

1: a blower;
2: a reactor, 21: a waste gas inlet, 22: a shell, 23: a waste gas outlet, 24: a preheating zone, 241: a second inlet header, 242: a second serpentine pipe, 243: a second outlet header, 25: a reaction zone, 251: a first inlet header, 252: a first serpentine pipe, 253: a first outlet header, 26: a heat recovery zone, 261: a superheating section, 262: an evaporation section, and 263: a low-temperature section;
3: a chimney;
4: a second steam drum; 41: a second descending pipe; 42: a second ascending pipe; 43: a second pressure control valve;
5: a first steam drum; 51: a first descending pipe; 52: a first ascending pipe; 53: a first pressure control valve; 54: an exhaust pipeline; 55: a first water-supply valve;
6: a steam ejection pipe;
7: a water-supply and pressure-stabilizing tank; and 71: a second water-supply valve.

DETAILED DESCRIPTION OF THE EMBODIMENTS

The technical solutions in the embodiments of the present disclosure are described clearly and completely below. Apparently, the described embodiments are merely a part rather than all of the embodiments of the present disclosure. All other embodiments obtained by those of ordinary skill in the art based on the embodiments of the present disclosure without creative efforts shall fall within the protection scope of the present disclosure.

Example 1

As shown in the FIGURE, this example provides a catalytic oxidation system for efficient conversion and removal of VOCs in a coal chemical industry, including reactor 2 and a first temperature control system.

The reactor 2 is produced by the enclosing of shell 22 with a U-shaped structure as a whole, and the reactor 2 is provided with waste gas inlet 21 and waste gas outlet 23. Preheating zone 24, reaction zone 25, and heat recovery zone 26 are provided in the reactor 2 sequentially in a flow direction of a waste gas. Specifically, the preheating zone 24 and the reaction zone 25 are distributed at a left side of the U-shaped structure, and the heat recovery zone 26 is distributed at a right side of the U-shaped structure.

The waste gas inlet 21 is connected to blower 1. The blower 1 is a non-sparking fan with frequency conversion control, and an output of the non-sparking fan can be flexibly adjusted according to a treatment capacity of a waste gas, which is conducive to electricity and energy conservation. The blower is configured to deliver an external VOCs-containing waste gas (referred to as a waste gas hereinafter) to the preheating zone 24.

The preheating zone 24 is configured to preheat a waste gas to 140° C. to 340° C. Specifically, the preheating temperature is allowed by a second temperature control system.

The second temperature control system includes second serpentine pipe 242 that horizontally or obliquely zigzags in a reciprocating manner and is arranged in the preheating zone 24, and second steam drum 4 arranged outside the reactor 2. The second steam drum 4 is connected to an inlet end of the second serpentine pipe 242, an outlet end of the second serpentine pipe 242 is connected to the heat recovery zone 26, and details can refer to the description of the heat recovery zone 26. A temperature of a waste gas at an outlet of the preheating zone 24 is adjusted to 140° C. to 340° C. by controlling a pressure of the second steam drum 4.

It should be noted that the second steam drum 4 is connected to the inlet end of the second serpentine pipe 242 through second descending pipe 41, and in order to allow the connection between the second descending pipe 41 and the second serpentine pipe 242, second inlet header 241 is provided at the inlet end of the second serpentine pipe 242. Similarly, in order to allow the connection between the second serpentine pipe 242 and the heat recovery zone 26, corresponding second outlet header 243 is also provided at the outlet end of the second serpentine pipe 242. The second outlet header 243 is arranged at a lower position than the second inlet header 241.

Catalyst 254 is filled in the reaction zone 25 to allow a catalytic oxidation reaction of a waste gas.

The catalyst 254 is any one or a combination of two or more of a granular catalyst, a foam catalyst, and a fiber mesh catalyst.

In order to allow the arrangement of the catalyst 254, porous support plate 255 is provided in the reaction zone 25, and the catalyst is arranged at an upper side of the porous support plate 255. During a catalytic oxidation reaction, a temperature in the reaction zone is controlled at 150° C. to 350° C. Specifically, the temperature in the reaction zone is allowed by the first temperature control system.

The first temperature control system includes first serpentine pipe 252 buried in the catalyst 254 and first steam drum 5 arranged outside the reactor 2, the first steam drum 5 and the first serpentine pipe 252 are connected through a pipeline to form a natural circulation line, and a temperature in the reaction zone is adjusted to 150° C. to 350° C. by controlling a pressure of the first steam drum 5.

A natural circulation principle of the first temperature control system is as follows: liquid water in the first serpentine pipe is continuously heated by the reaction heat produced due to the catalytic oxidation of a waste gas, such that the liquid water changes from a liquid phase to a steam/liquid mixed phase, a buoyancy force is generated due to a density gradient, and a natural circulation flow is driven by a gravity difference.

It should be noted that the first steam drum 5 is connected to the inlet end of the first serpentine pipe 252 through first descending pipe 51, and in order to allow the connection between the first descending pipe 51 and the first serpentine pipe 252, first inlet header 251 is provided at the inlet end of the first serpentine pipe 252.

Similarly, the first steam drum 5 is connected to the outlet end of the first serpentine pipe 252 through first ascending pipe 52, and in order to allow the connection between the first ascending pipe 52 and the first serpentine pipe 252, first outlet header 253 is provided at the outlet end of the first serpentine pipe 252. The first outlet header 253 is arranged at a higher position than the first inlet header 251.

The second temperature control system further includes a third serpentine pipe arranged in the heat recovery zone 26, and the third serpentine pipe includes superheating section 261, evaporation section 262, and low-temperature section 263 arranged sequentially in the flow direction of the waste gas. After undergoing a heat exchange in the superheating section 261, the evaporation section 262, and the low-temperature section 263 sequentially, a waste gas is cooled to 60° C. to 90° C. from 150° C. to 350° C., and then a cooled waste gas is delivered through the waste gas outlet 23 to chimney 3 and then discharged.

In order to allow passive natural circulation, an inlet end of the low-temperature section 263 is connected to the outlet end of the second serpentine pipe 242, an outlet end of the superheating section 261 is connected to the second steam drum 4 through the second ascending pipe 42, and a hot steam generated after a heat exchange is delivered to the second steam drum 4.

A principle of passive natural circulation is as follows: liquid water is heated in the heat recovery zone to change from a liquid phase to a steam/liquid mixed phase and to have a decreased density, and is cooled in the preheating zone to have an increased density, and a gravity difference occurs between cold and hot sections to drive the natural circulation in a main pipeline, such that the heat is delivered from the heat recovery zone to the preheating zone. The passive natural circulation line can be free of any active components, which reduces the operating cost and avoids the problems such as pump failure and uneven flow distribution caused by a pump.

In this solution, the steam discharge between the first steam drum 5 and the second steam drum 4 is also conducted. Specifically, the catalytic oxidation system further includes exhaust pipeline 54, where one end of the exhaust pipeline 54 is connected to the first steam drum 5, and the other end of the exhaust pipeline is connected to the second steam drum 4; and the first steam drum 5 is further provided with first pressure control valve 53. When the pressure of the first steam drum 5 exceeds a set threshold (0.47 MPa to 16.5 MPa), the first pressure control valve 53 is opened, and a steam in the first steam drum 5 is discharged into the second steam drum 4 through the exhaust pipeline 54. When the pressure of the first steam drum 5 returns to be the set threshold or lower, the first pressure control valve 53 is automatically closed to stop the discharge. As a result, the excess heat in the reaction zone 25 can be delivered through the first steam drum 5 to the second steam drum 4 in a form of a steam, and finally fed through the second descending pipe 41 back to the preheating zone 24 in a form of boiling water.

The first steam drum 5 is further provided with first water-supply valve 55 configured to automatically control a liquid level.

In this solution, water-supply and pressure-stabilizing tank 6 is provided on a connecting pipeline between the inlet end of the low-temperature section 263 and the outlet end of the second serpentine pipe 242, and the water-supply and pressure-stabilizing tank 6 is further provided with second water-supply valve 61 configured to automatically control a liquid level. The water supply and pressure stabilization can be allowed by controlling a liquid level of the water-supply and pressure-stabilizing tank.

In addition, the second steam drum 4 is provided with second pressure control valve 43 and an efflux pipeline; and when the pressure of the second steam drum 4 exceeds a set threshold, the second pressure control valve 43 is opened, and a steam in the second steam drum 4 is delivered to a steam pipe network in a plant zone. A temperature of boiling water in the inlet header 241 in the preheating zone can be adjusted to 150° C. to 350° C. by controlling the pressure in the second steam drum 4, such that a temperature of a preheated waste gas reaches 140° C. to 340° C.

It should be noted that the first serpentine pipe 252 is a high-temperature alloy steel pipe with an inner diameter of 10 mm to 50 mm; and the second serpentine pipe 242 and the third serpentine pipe each are a high-temperature alloy finned pipe with an inner diameter of 10 mm to 50 mm.

Steam ejection pipe 6 is connected to the inlet end of the second serpentine pipe 242, and when the catalytic oxidation system is started for the first time, the steam ejection pip 6 delivers a steam in a steam pipe network in a plant zone into the second serpentine pipe 242.

In order to further stabilize a pressure in a pipeline of the second temperature control system, water-supply and pressure-stabilizing tank 7 is provided on a pipeline between the second serpentine pipe and the third serpentine pipe, and the water-supply and pressure-stabilizing tank 7 is provided with second water-supply valve 71. A pipeline pressure of the second temperature control system is stabilized between 0.47 MPa and 16.5 MPa by controlling a liquid level in the water-supply and pressure-stabilizing tank 7.

Example 2

This example provides a catalytic oxidation method based on the catalytic oxidation system for efficient conversion and removal of VOCs in a coal chemical industry in Example 1, including the following steps:

S0: When the catalytic oxidation system is started for the first time, a high-temperature and high-pressure steam in a steam pipe network in a plant zone is delivered through the steam ejection pipe 6 into the second serpentine pipe 242 in the preheating zone 24.

S1: A waste gas is fed into the reactor.

S2: The waste gas is delivered to the preheating zone and preheated to 140° C. to 340° C. to obtain a preheated waste gas.

S3: The preheated waste gas is delivered to the reaction zone, the temperature in the reaction zone is controlled at 150° C. to 350° C. by the first temperature control system, and an oxidation reaction is allowed under a catalytic action of the catalyst to obtain a treated waste gas. The VOCs-containing waste gas is oxidized to produce carbon dioxide and gaseous water while releasing the reaction heat.

After a waste gas undergoes a heat exchange with the first serpentine pipe 252, a flow at a steam/liquid mixed phase is produced. The first serpentine pipe 252, the first ascending pipe 52, the first steam drum 5, and the first descending pipe 51 constitute a steam/liquid natural circulation loop. The first steam drum 5 is provided with the first pressure control valve 53. When a pressure in the first steam drum exceeds a set value (0.47 MPa to 16.5 MPa), a saturated steam in the first steam drum 5 is discharged into the second steam drum 4 through the first pressure control valve 53. When a pressure in the first steam drum 5 returns to be the set value or lower, the first pressure control valve 53 is automatically closed.

S4: The treated waste gas is delivered to the heat recovery zone and allowed to undergo a heat exchange with the superheating section, the evaporation section, and the low-temperature section sequentially to produce a steam and cool the treated waste gas to 60° C. to 90° C. to obtain a cooled treated waste gas, and the cooled treated waste gas is discharged through a chimney.

The produced steam enters the second steam drum 4 through the second ascending pipe 42.

Boiling water in the second steam drum 4 enters the second serpentine pipe 242 in the preheating zone 24 through the second descending pipe 41, and undergoes a heat exchange with a waste gas to produce low-temperature water, and finally the low-temperature water enters the low-temperature section 263 in the heat recovery zone 26 through connecting pipeline 62.

The second steam drum 4 is provided with the second pressure control valve 43. When a pressure in the second steam drum exceeds a set value (0.47 MPa to 16.5 MPa), a saturated steam in the second steam drum 4 is discharged into a steam pipe network in a plant zone through the second pressure control valve 43. When a pressure in the second steam drum 4 returns to be the set value or lower, the second pressure control valve 43 is automatically closed.

It is apparent for those skilled in the art that the present disclosure is not limited to details of the above exemplary embodiments, and that the present disclosure may be implemented in other specific forms without departing from spirit or basic features of the present disclosure. Accordingly, the embodiments should be regarded in all points of view as exemplary and not restrictive, and the scope of the present disclosure is defined by the appended claims rather than the above description. Therefore, all changes falling within the meaning and scope of equivalent elements of the claims should be included in the present disclosure.

What is claimed is:

1. A catalytic oxidation system for an efficient conversion and removal of volatile organic compounds (VOCs) in a coal chemical industry, comprising a reactor and a first temperature control system, wherein the reactor is provided with a waste gas inlet and a waste gas outlet and is provided with a preheating zone, a reaction zone, and a heat recovery zone sequentially in a flow direction of a waste gas, and a catalyst is filled in the reaction zone;

the first temperature control system comprises a first serpentine pipe buried in the catalyst and a first steam drum arranged outside the reactor, the first steam drum and the first serpentine pipe are connected through a pipeline to form a circulation line, and a temperature in the reaction zone is adjusted to 150° C. to 350° C. by controlling a pressure of the first steam drum;

the catalytic oxidation system further comprises a second temperature control system, the second temperature control system comprises a second serpentine pipe arranged in the preheating zone, a third serpentine pipe arranged in the heat recovery zone, and a second steam drum arranged outside the reactor; the second steam drum is connected to an inlet end of the second serpentine pipe, an outlet end of the second serpentine pipe is connected to an inlet end of the third serpentine pipe, and an outlet end of the third serpentine pipe is connected to the second steam drum; and a temperature of the waste gas at an outlet of the preheating zone is adjusted to 140° C. to 340° C. by controlling a pressure of the second steam drum;

the catalytic oxidation system further comprises an exhaust pipeline, a first end of the exhaust pipeline is connected to the first steam drum, and a second end of the exhaust pipeline is connected to the second steam drum; the first steam drum is further provided with a first pressure control valve; when the pressure of the first steam drum exceeds a set threshold, the first pressure control valve is opened, and a steam in the first steam drum is discharged into the second steam drum through the exhaust pipeline; and when the pressure of the first steam drum returns to be the set threshold or lower, the first pressure control valve is closed;

the third serpentine pipe comprises a superheating section, an evaporation section, and a low-temperature section arranged sequentially in the flow direction of the waste gas; and an inlet end of the low-temperature section is connected to the outlet end of the second serpentine pipe, and an outlet end of the surperheating section is connected to the second steam drum through a second ascending pipe, and a hot steam generated after a heat exchange is transported to the second steam drum.

2. The catalytic oxidation system for the efficient conversion and removal of the VOCs in the coal chemical industry according to claim 1, wherein the second steam drum is provided with a second pressure control valve and an efflux pipeline; and when the pressure of the second steam drum exceeds the set threshold, the second pressure control valve is opened, and a steam in the second steam drum is delivered to a steam pipe network in a plant zone.

3. The catalytic oxidation system for the efficient conversion and removal of the VOCs in the coal chemical industry according to claim 1, wherein the set threshold is 0.47 MPa to 16.5 MPa.

4. The catalytic oxidation system for the efficient conversion and removal of the VOCs in the coal chemical industry according to claim 1, wherein a water-supply and pressure-stabilizing tank is provided between the second serpentine pipe and the third serpentine pipe, and a pipeline pressure of the second temperature control system is stabilized between 0.47 MPa and 16.5 MPa by controlling a liquid level in the water-supply and pressure-stabilizing tank.

5. The catalytic oxidation system for the efficient conversion and removal of the VOCs in the coal chemical industry according to claim 1, wherein a steam ejection pipe is connected to the inlet end of the second serpentine pipe, and when the catalytic oxidation system is started for a first time, the steam ejection pipe delivers a steam in a steam pipe network in a plant zone into the second serpentine pipe.

6. A catalytic oxidation method based on the catalytic oxidation system for the efficient conversion and removal of the VOCs in the coal chemical industry according to claim 1, comprising the following steps:

S1, feeding the waste gas into the reactor;

S2, delivering the waste gas to the preheating zone, and preheating the waste gas to 140° C. to 340° C. to obtain a preheated waste gas; and S3, delivering the preheated waste gas to the reaction zone, controlling the temperature in the reaction zone at 150° C. to 350° C. by the first temperature control system, and allowing an oxidation reaction under a catalytic action of the catalyst to obtain a treated waste gas.

7. The catalytic oxidation method based on the catalytic oxidation system for the efficient conversion and removal of the VOCs in the coal chemical industry according to claim 6, wherein after the S3, the catalytic oxidation method further comprises:

S4, delivering the treated waste gas to the heat recovery zone, allowing a heat exchange in the superheating section, the evaporation section, and the low-temperature section sequentially to cool the treated waste gas to 60° C. to 90° C. to obtain a cooled treated waste gas, and discharging the cooled treated waste gas through a chimney.

8. A catalytic oxidation method based on the catalytic oxidation system for the efficient conversion and removal of the VOCs in the coal chemical industry according to claim 2, comprising the following steps:

S1, feeding the waste gas into the reactor;

S2, delivering the waste gas to the preheating zone, and preheating the waste gas to 140° C. to 340° C. to obtain a preheated waste gas; and S3, delivering the preheated waste gas to the reaction zone, controlling the temperature in the reaction zone at 150° C. to 350° C. by the first temperature control system, and allowing an oxidation reaction under a catalytic action of the catalyst to obtain a treated waste gas.

9. A catalytic oxidation method based on the catalytic oxidation system for the efficient conversion and removal of the VOCs in the coal chemical industry according to claim 3, comprising the following steps:

S1, feeding the waste gas into the reactor;

S2, delivering the waste gas to the preheating zone, and preheating the waste gas to 140° C. to 340° C. to obtain a preheated waste gas; and S3, delivering the preheated waste gas to the reaction zone, controlling the temperature in the reaction zone at 150° C. to 350° C. by the first temperature control system, and allowing an oxidation reaction under a catalytic action of the catalyst to obtain a treated waste gas.

10. A catalytic oxidation method based on the catalytic oxidation system for the efficient conversion and removal of the VOCs in the coal chemical industry according to claim 4, comprising the following steps:

S1, feeding the waste gas into the reactor;

S2, delivering the waste gas to the preheating zone, and preheating the waste gas to 140° C. to 340° C. to obtain a preheated waste gas; and S3, delivering the preheated waste gas to the reaction zone, controlling the temperature in the reaction zone at 150° C. to 350° C. by the first temperature control system, and allowing an oxidation reaction under a catalytic action of the catalyst to obtain a treated waste gas.

11. A catalytic oxidation method based on the catalytic oxidation system for the efficient conversion and removal of the VOCs in the coal chemical industry according to claim 5, comprising the following steps:

S1, feeding the waste gas into the reactor;

S2, delivering the waste gas to the preheating zone, and preheating the waste gas to 140° C. to 340° C. to obtain a preheated waste gas; and S3, delivering the preheated waste gas to the reaction zone, controlling the temperature in the reaction zone at 150° C. to 350° C. by the first temperature control system, and allowing an oxidation reaction under a catalytic action of the catalyst to obtain a treated waste gas.

12. The catalytic oxidation method based on the catalytic oxidation system for the efficient conversion and removal of the VOCs in the coal chemical industry according to claim 8, wherein after the S3, the catalytic oxidation method further comprises:

S4, delivering the treated waste gas to the heat recovery zone, allowing a heat exchange in the superheating section, the evaporation section, and the low-temperature section sequentially to cool the treated waste gas to 60° C. to 90° C. to obtain a cooled treated waste gas, and discharging the cooled treated waste gas through a chimney.

13. The catalytic oxidation method based on the catalytic oxidation system for the efficient conversion and removal of the VOCs in the coal chemical industry according to claim 9, wherein after the S3, the catalytic oxidation method further comprises:

S4, delivering the treated waste gas to the heat recovery zone, allowing a heat exchange in the superheating section, the evaporation section, and the low-temperature section sequentially to cool the treated waste gas to 60° C. to 90° C. to obtain a cooled treated waste gas, and discharging the cooled treated waste gas through a chimney.

14. The catalytic oxidation method based on the catalytic oxidation system for the efficient conversion and removal of the VOCs in the coal chemical industry according to claim 10, wherein after the S3, the catalytic oxidation method further comprises:

S4, delivering the treated waste gas to the heat recovery zone, allowing a heat exchange in the superheating section, the evaporation section, and the low-temperature section sequentially to cool the treated waste gas to 60° C. to 90° C. to obtain a cooled treated waste gas, and discharging the cooled treated waste gas through a chimney.

15. The catalytic oxidation method based on the catalytic oxidation system for the efficient conversion and removal of the VOCs in the coal chemical industry according to claim 11, wherein after the S3, the catalytic oxidation method further comprises:

S4, delivering the treated waste gas to the heat recovery zone, allowing a heat exchange in the superheating section, the evaporation section, and the low-temperature section sequentially to cool the treated waste gas to 60° C. to 90° C. to obtain a cooled treated waste gas, and discharging the cooled treated waste gas through a chimney.

* * * * *